US006364915B1

(12) United States Patent
Chapman-Irwin et al.

(10) Patent No.: US 6,364,915 B1
(45) Date of Patent: Apr. 2, 2002

(54) METHOD OF SEALING AN ULTRACAPACITOR SUBSTANTIALLY FREE OF WATER

(75) Inventors: Patricia Chapman-Irwin, Altamont; Thomas Paul Feist, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/625,209

(22) Filed: Jul. 24, 2000

Related U.S. Application Data

(62) Division of application No. 09/162,532, filed on Sep. 29, 1998, now Pat. No. 6,212,061.

(51) Int. Cl.[7] .......................... H01G 9/00; H01G 9/10; H01G 5/38

(52) U.S. Cl. ...................... 29/25.03; 361/502; 361/512; 361/517; 361/518; 361/522

(58) Field of Search ............................ 29/25.01–25.03; 361/502, 503, 509, 512, 513, 517, 518, 522, 519

(56) References Cited

U.S. PATENT DOCUMENTS 4,052,537 A 10/1977 Mallory
4,065,636 A 12/1977 Herczog
4,115,630 A * 9/1978 Van Ommering et al. ..... 429/72
4,212,337 A 7/1980 Kamp ........................... 150/3
4,363,345 A 12/1982 Scheibner .................... 429/27
4,803,597 A 2/1989 Watanabe et al. ........... 361/502
5,070,584 A 12/1991 Dais et al. .................... 24/587
5,136,472 A 8/1992 Tsuchiya et al. ............ 361/502
5,141,577 A 8/1992 Porchia et al. ................ 156/66
5,150,283 A 9/1992 Yoshida et al. ............. 361/502
5,227,960 A 7/1993 Kunishi et al.
5,420,747 A 5/1995 Ivanov et al. ............... 361/502
5,456,928 A 10/1995 Hustad et al.
5,464,453 A 11/1995 Tong et al. ................ 29/25.03
5,529,858 A 6/1996 Wicker et al. ............. 429/169
5,621,607 A 4/1997 Farahmandi et al.
5,682,288 A * 10/1997 Wani .......................... 361/502
5,726,856 A 3/1998 King, Jr. et al. ............ 361/505
5,777,428 A 7/1998 Farahmandi et al.

FOREIGN PATENT DOCUMENTS

WO 11486 4/1996

OTHER PUBLICATIONS

"Mobility and Ionic Association of Lithium Salts in a Propylene Carbonate–Ethyl Methyl Carbonate Mixed Solvent", Ue & Mori, Electrochem. Soc., vol. 142, No. 8, Aug. 1995.

* cited by examiner

*Primary Examiner*—Ha Tran Nguyen
(74) *Attorney, Agent, or Firm*—Robert P. Santandrea; Noreen C. Johnson

(57) ABSTRACT

A method of sealing an ultracapacitor substantially free of water is disclosed. The method includes providing a multilayer cell comprising two solid, non porous current collectors, separated by two porous electrodes with a separator between the two electrodes, sealing the cell with a reclosable hermetic closure. Water inside the closure is dissociated by an applied voltage to the cell and escapes in the form of hydrogen and oxygen when the closure is unmated, the closure is then mated to hermetically seal the cell which is substantially free of water.

5 Claims, 2 Drawing Sheets

METHOD OF SEALING AN ULTRACAPACITOR SUBSTANTIALLY FREE OF WATER

This application is a division of application Ser. No. 09/162,532, filed Sep. 29, 1998, now U.S. Pat. No. 6,212,061 which is hereby incorporated by reference in its entirety.

This invention was made with government support under Contract No. 38-83CH10093 awarded by DOE. The government may have certain rights in the invention.

BACKGROUND OF THE INVENTION

Capacitors are storage devices that store electrical energy on an electrode surface. Electrochemical cells create an electrical charge at electrodes by chemical reaction. The ability to store or create electrical charge is a function of electrode surface area in both applications. Ultracapacitors, sometimes referred to as double layer capacitors, are a third type of storage device. An ultracapacitor creates and stores energy by microscopic charge separation at an electrical chemical interface between electrode and electrolyte.

Ultracapacitors are able to store more energy per weight than traditional capacitors and they typically deliver the energy at a higher power rating than many rechargeable batteries. Ultracapacitors comprise two porous electrodes that are isolated from electrical contact by a porous separator. The separator and the electrodes are impregnated with an electrolytic solution, which allows ionic current to flow between the electrodes while preventing electronic current from discharging the cell. Each electrode is in intimate contact with a current collector. One purpose of the current collector is to reduce ohmic loss. If the current collectors are nonporous, they can also be used as part of the capacitor case and seal.

When electric potential is applied to an ultracapacitor cell, ionic current flows due to the attraction of anions to the positive electrode and cations to the negative electrode. Upon reaching the electrode surface, the ionic charge accumulates to create a layer at the solid liquid interface region. This is accomplished by absorption of the charge species themselves and by realignment of dipoles of the solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the ultracapacitor electrodes causes ionic current to flow as anions are discharged from the surface of the positive electrode and cations are discharged from the surface of the negative electrode while an electronic current flows through an external circuit between electrode current collectors.

In summary, the ultracapacitor stores energy by separation of positive and negative charges at the interface between electrode and electrolyte. An electrical double layer at this location consists of sorbed ions on the electrode as well as solvated ions. Proximity between the electrodes and solvated ions is limited by a separation sheath to create positive and negative charges separated by a distance which produces a true capacitance in the electrical sense.

During use, an ultracapacitor cell is discharged by connecting the electrical connectors to an electrical device such as a portable radio, an electric motor, light emitting diode or other electrical device. The ultracapacitor is not a primary cell but can be recharged. The process of charging and discharging may be repeated over and over. For example, after discharging an ultracapacitor by powering an electrical device, the ultracapacitor can be recharged by supplying potential to the connectors.

The physical processes involved in energy storage in an ultracapacitor are distinctly different from the electrochemical oxidation/reduction processes responsible for charge storage in batteries. Further unlike parallel plate capacitors, ultracapacitors store charge at an atomic level between electrode and electrolyte. The double layer charge storage mechanism of an ultracapacitor is highly efficient and can produce high specific capacitance, up to several hundred Farads per cubic centimeter.

Nonaqueous ultracapacitors use an organic salt solution as an electrolyte. Low levels of moisture and loss of electrolyte both contribute to degradation of the ultracapacitor cells. Such degradation adversely affects both performance and life of an ultracapacitor. Hence, proper sealing of an ultracapacitor cell is paramount to the manufacture of a high performance, long-lived cell. Proper sealing has been difficult because of the aggressive chemical nature of many of the aprotic polar solvents used as cell electrolyte solvents. Many of the common adhesives such as epoxies, cyanate esters, silicones and ethylene vinyl acetates fail mechanically, lose adhesion or permit defusion of solvent through sealant. The common failure of sealants requires that a secondary container be used to completely contain and seal the ultracapacitor cell. The present invention provides a hermetic and leak proof seal through a primary seal with the current collectors of the ultracapacitor thus eliminating the need for a secondary container. Further, the present invention uses a resealable closure mechanism that allows repair of the cell and removal of internal moisture by release of gas pressure.

SUMMARY OF THE INVENTION

The invention relates to an ultracapacitor that comprises at least one cell comprising two solid, nonporous current collectors, two porous electrodes separating the current collectors, a porous separator between the electrodes and an electrolyte occupying pores in the electrodes and separator. The cell is sealed with a reclosable hermetic closure.

The invention also relates to a stack of ultracapacitor cells comprising a plurality of bipolar double layer ultracapacitor cells in stacked relationship, at least one cell comprising porous, oppositely charged electrodes with an ionically charged separator disposed between the electrodes. The stack includes a non-porous current collector between each cell with each current collector having adjoining polarized electrodes of different cells bonded thereto. An electrolyte saturates the electrodes and separators. At least one cell of the stack is sealed with a reclosable hermetic closure.

In another aspect, the invention relates to a method of making an ultracapacitor, comprising providing a multilayer cell comprising two solid, nonporous current collectors, two porous electrodes separating the current collectors, a porous separator between the electrodes and an electrolyte occupying pores in the electrodes and separator. The cell is then sealed with a reclosable hermetic closure.

In a final aspect, the invention relates a method of making a stack of ultracapacitor cells. In the method, a plurality of bipolar double layer ultracapacitor cells are provided in stacked relationship. At least one cell comprises porous, oppositely charged electrodes with an ionically charged separator disposed between the electrodes. a non-porous current collector is provided between each cell with each current collector having adjoining polarized electrodes of different cells bonded thereto. The electrodes and separators are saturated with electrolyte and at least one cell of the stack is sealed with a reclosable hermetic closure.

DETAILED DESCRIPTION OF THE INVENTION

Figure 1:
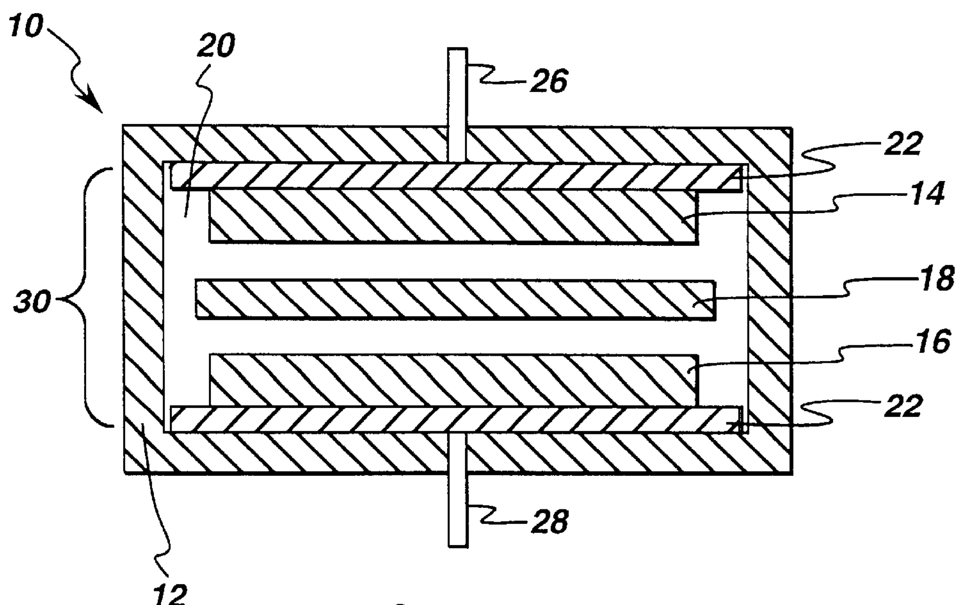
FIG. 1 is a front sectional view of an ultracapacitor.
Figure 2:
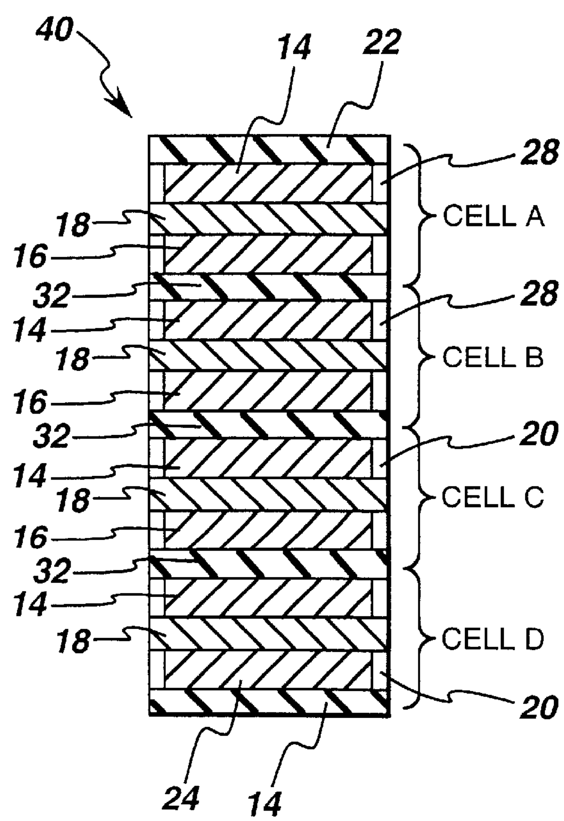
FIG. 2 is a front sectional view of a series stack of ultracapacitor cells.

The sealing method of the invention may be used to make a wide variety of ultracapacitors such as described in U.S. Pat. Nos. 5,464,453; 5,420,747; 5,150,283; 5,136,472; and 4,803,597; as well as PCT Application WO96/11486 (PCT/US95/12772; Apr. 18, 1996), all of which are incorporated herein by reference. FIGS. 1 and 2 herein, are based on PCT Application WO 96/11486 and show non-limiting examples of structures that can be sealed according to the present invention.

In all of the Figures of this application, like structures are identified by the same numbers.

Referring to FIG. 1, ultracapacitor 10 includes a nonconductive enclosing body 12, a pair of carbon electrodes 14 and 16, an electronic porous separator layer 18, an electrolyte 20, a pair of conductive layers which are current collectors 22 and 24 and electrical leads 26 and 28, extending from the current collectors 22 and 24. One of the pair of current collectors 22 and 24 is attached to the back of each electrode 14 and 16. In FIG. 1, electrodes 14 and 16 can each represent a plurality of electrodes so long as the electrodes are porous to electrolyte flow.

The current collectors 22, 24 can be made of a metal foil such as aluminum, conductive polymer or polymer with a conductive filler. Carbon-filled polyethylene is a preferred material for the current collectors 22,24 of the present invention.

The electronic separator 18 is preferably made from a highly porous material which acts as an electronic insulator between the carbon electrodes 14 and 16. The separator 18 assures that opposing electrodes 14 and 16 are never in contact with one another. Contact between electrodes can result in a short circuit and rapid depletion of the charges stored in the electrodes. The porous nature of the separator 18 allows movement of ions in the electrolyte 20. A wide variety of types and arrangements of separation layers can be employed, as those of ordinary skill in the electrochemical arts realize. Separation layers are usually made from nonconductive materials such as cellulosic materials; glass fiber; polymers such as polyesters or polyolefins; and the like. In those embodiments in which the separator layers will be in contact with sealant material, they should have a porosity sufficient to permit the passage of sealant and should be resistant to the chemical components in the sealant. In a typical ultracapacitor, the separator layers have a thickness in the range of about 0.5 mil to about 10 mils. Preferred separators 18 are porous polypropylene and tissue cellulosic materials. Exemplary organic solvents for electrolyte 20 include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. Preferably, the electrolyte 20 includes a polar aprotic organic solvent such as a cyclic ester, chain carbonate, cyclic carbonate, chain ether and/or cyclic ether solvent and a salt. Preferred cyclic esters are esters having 3 to 8 carbon atoms. Examples of the cyclic esters include β-butyrolactone, γ-butyrolactone, γ-valerolactone and δ-valerolactone. The chain carbonates are preferred to be carbonates having 3 to 8 carbon atoms. Examples of the chain carbonates include dimethyl carbonate, diethyl carbonate, dipropyl carbonate, methyl ethyl carbonate, methyl propyl carbonate and ethyl propyl carbonate. The preferred cyclic carbonates have 5 to 8 carbon atoms. Examples of the cyclic carbonates include 1,2-butylene carbonate, 2,3-butylene carbonate, 1,2-pentene carbonate, 2,3-pentene carbonate and propylene carbonate. The preferred chain ethers have 4 to 8 carbon atoms. Examples of the chain ethers include dimethoxyethane, diethoxyethane, methoxyethoxyethane, dibutoxyethane, dimethoxypropane, diethoxypropane and methoxyethoxypropnane. The preferred cyclic ethers have 3 to 8 carbon atoms. Examples of the cyclic ethers include tetrahydofuran, 2-methyl-tetrahydrofuran, 1,3-dioxolan, 1,2-dioxolan, 2-methyldioxolan and 4-methyl-dioxolan.

Suitable electrolyte salts include quaternary ammonium salts such as tetraethylammonium tetraflouroborate ($(Et)_4NBF_4$), hexasubstituted guanidinium salts such as disclosed in U.S. Pat. No. 5,726,856, the disclosure of which is incorporated herein by reference, and lithium salts such as disclosed by Ue et al., Mobility and Ionic Association of Lithium Salts in a Propylene Carbonate-Ethyl Carbonate Mixed Solvent, *Electrochem. Soc.*, vol. 142, No. Aug. 8, 1995, the disclosure of which is incorporated herein by reference.

In a preferred embodiment, the electrodes 14, 16 in FIG. 1, are both carbon electrodes on carbon-filled polyethylene current collectors. The electrode can be fabricated by a forming process or by pressing electrode materials in a die and slurry pasting or screen printing carbon as a paste with a liquid phase binder/fluidizer. The liquid phase may be water or an electrolyte solvent with or without a thinner such as acetone. Both dry and wet electrode formations may include a binder such as polymers, starches, Teflon® particles or Teflon® dispersions in water.

The enclosing body 12 can be any known enclosure means commonly used with ultracapacitors. It is an advantage to minimize the weight of the packaging means to maximize the energy density of the ultracapacitor. Packaged ultracapacitors are typically expected to weigh 1.25 to 2 times more than the unpackaged ultracapacitor. The electrical leads 26 and 28 extend from the current collectors 22 and 24 through the enclosing body 12 and are adapted for connection with an electrical circuit (not shown).

Individual ultracapacitor cells can be stacked in series to increase operating voltage. The optimum design is to have adjacent cells separated with only a single current collector. This collector is nonporous so that no electrolytic solution is shared between cells. This type of design is called bipolar and is illustrated in FIG. 2 of the drawings. In a bipolar double layer capacitor, one side of the current collector contacts a positive electrode and the other side contacts a negative electrode of an adjacent cell. A series stack 40 of the high performance bipolar double layer cells 30 (A, B, C and D) is illustrated in FIG. 2. In FIG. 2, each pair of polarized carbon electrodes, 14, 16 is separated with a separator 18. A current collector 32 is attached at one surface to charged electrode 14 of a first cell. Attached to an opposite surface of the current collector 32, is an oppositely charged electrode 16 of a second cell. If one side of the current collector 32 is in contact with the negative electrode for a first capacitor cell "A," then the other side of the same current collector 32 is in contact with a positive electrode for an adjacent cell "B." A sufficient amount of an electrolyte 20 is introduced such that the electrolyte 20 saturates the electrodes 14 and 16 and separator 18 within each cell. Exterior current collectors 22 and 24 are placed at each end of the stack.

The internal current collectors 32 of the series stack of cells are preferably carbon filled polyethylene layers designed to separate the electrolyte 20 between adjacent cells. The exterior current collectors are also nonporous such that they can be used as part of the external capacitor case seal, if necessary. The electronic separator 18 is located between the opposing carbon electrodes 14 and 16 within a particular capacitor cell. The electronic separator 18 allows ionic conduction via charged ions in the electrolyte.

Figure 3:
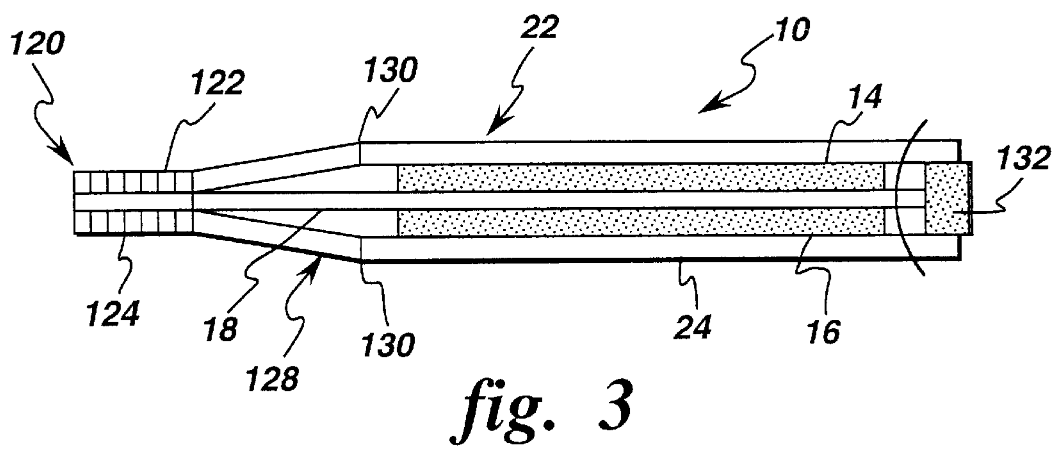
FIG. 3 is a schematic representation of an ultracapacitor cell sealed with a reclosable hermetic closure.

In the present invention, the ultracapacitor cell of FIG. 1 and at least one cell of the stack of FIG. 2 are sealed with a reclosable hermetic closure. FIG. 3 is a schematic representation of an ultracapacitor cell sealed with a reclosable hermetic closure according to the present invention and FIGS. 4A and 4B are sectional views of a preferred embodiment of a reclosable hermetic closures according to the invention both unclosed (FIG. 4A) and closed (FIG. 4B).

In FIG. 3, cell 10 includes current collectors 22, 24 which preferably are made of a material that is compatible with the material of the reclosable hermetic closure as hereinafter described. Preferably, the collectors 22, 24 are carbon filled polyethylene. The cell 10 includes a separator 18 and electrodes 14, 16. The cell 10 is sealed on at least one side by a reclosable hermetic closure represented schematically at 120. The remaining sides are sealed with sealant 132. The closure 120 includes interlocking closure elements 122, 124 and supporting polyolefinic film portions 128 which can be polyethylene or polypropylene film or the like, and which are attached to respective current collectors 22, 24 by means of heat weld joints 130. The closure 120 can be any type that can be reopened to release gas and reduce internal pressure of the cell 10 and reclosed to form an hermetic seal. Suitable closures 120 include mechanical closures and adhesive closures and the like. Preferably, closure 120 is a mechanical closure formed by interlocking elements such as interlocking channel elements, interlocking rib and groove profiles such as zipper closures and interlocking male and female elements as hereinafter described with reference to FIGS. 4A and 4B. The types of closures used with Ziploc® (DowBrands, Indianapolis, Ind.) bags are preferred closures 120.

Figure 4A:
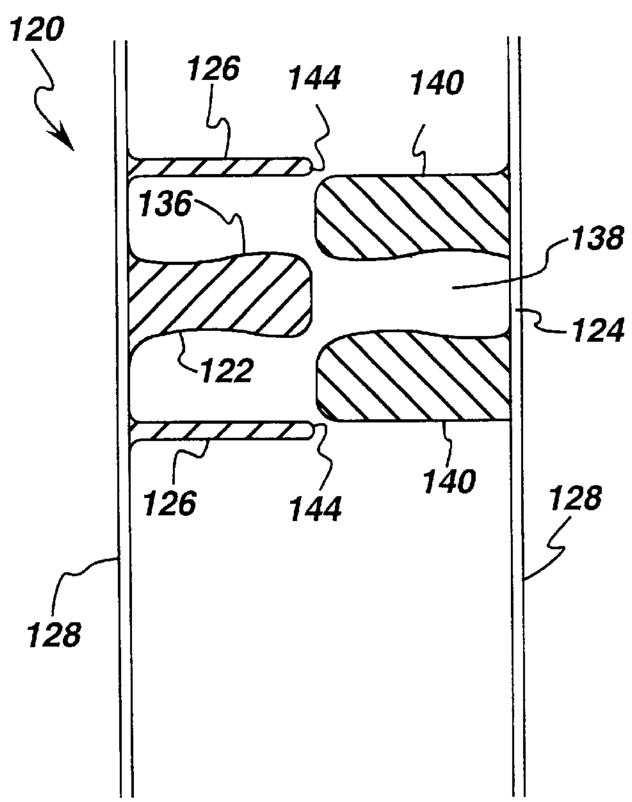
FIG. 4A is a sectional views of an unclosed reclosable hermetic closure and FIG. 4B is a sectional view of a closed reclosable hermetic closure.
Figure 4B:
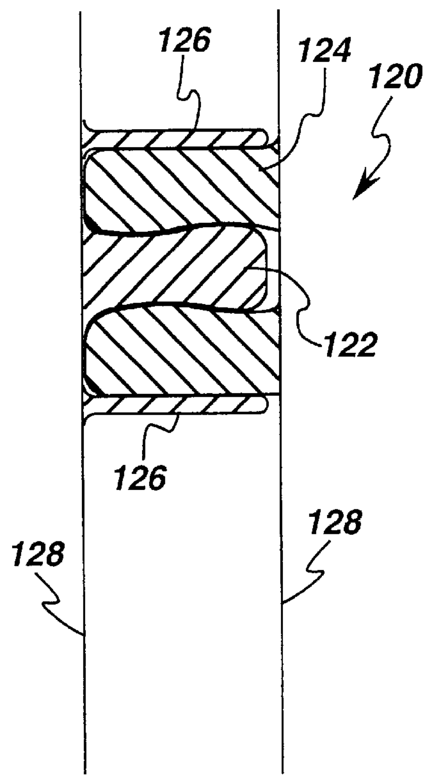

FIGS. 4A and 4B show a preferred closure 120 which is an interlocking male element and female element type. Referring to FIGS. 4A and 4B, closure 120 comprises oppositely disposed male and female closure elements 122 and 124 and ribs 126 for guiding the elements 122 and 124 into interlocking engagement when a deforming compressive force is applied to the outer surfaces of film portion 128. The male closure element 122 consists of a single blunt-shaped profile member which extends from film portion 128 and has a blunt head extremity 136, which is suited for interlocking with the cavity 138 formed by profile members 140 of the female element 124.

The means employed by the embodiment of FIGS. 4A and 4B for guiding the extremity 136 and cavity 138 into interlocking engagement comprises flexible ribs 126 which flank the profile member 132 on both sides and which are positioned generally adjacent the profile member 132. Each rib 126 is characterized by a bevel 144 that slopes downwardly towards profile member 132. During closure, the bevels 144 contact and guide respective extremities 138 of the female element 124 into an interlocking engagement with blunt head extremity 136 as shown in FIG. 4B.

The closure 120 has a differential pressure requirement that relates to an internal release pressure of the cell. Preferably the release pressure (the pressure which will cause release of the closure 120) is a factor of about 10 to about 20 times greater than internal cell pressure. Blunt head extremity 136 has an angled profile. Hence, when the blunt head extremity 136 is in interlocking relationship with cavity 138 as shown in FIG. 4B, one side is tightly urged against one wall of the cavity 138 to provide a seal that is released only upon application of the release pressure specified by the present invention.

The ultracapacitor cell of the present invention is sealed by the reclosable hermetic closure at one or more sides and is otherwise sealed by the application of pressure and/or heat with or without a sealant at remaining sides. Many different types of sealants can be used in the present invention and the term is meant to encompass, "glues", or "pastes." Sealants are described, for example, in the *Kirk-Othmer Encyclopedia of Chemical Technology,* 3rd Edition, Vol. 1, pp.488–508 (1978), and in *The Condensed Chemical Dictionary,* 10th Edition, 1981, Van Nostrand Reinhold Company. In general, the selected sealant should be chemically resistant to electrolyte. It should also be capable of withstanding operating temperatures of the ultracapacitor without substantial degradation. Moreover in those embodiments where the sealant contacts the separators, it should be capable of flowing through the thickness of the separator layers. Once cured, the sealant should be substantially impermeable to the flow or passage of electrolyte.

Heat-curable sealants may be used in some embodiments. Moisture-cured sealants or externally-cured materials may be used. Other embodiments may use air-curable or pressure-sensitive sealants, such as "hot melt" glues. Illustrative sealants include those based on acrylic, ethylene such as ethylene vinyl acetate (EVA) copolymer, silicone, rubber, epoxy materials, or combinations of these materials. Commercial examples include the materials commonly referred to as "hot glues."

The sealants are usually in the form of liquids, pastes, or solids. A sealant may be applied to one or both of the facing surfaces of the separators or other surfaces. Many techniques are available for applying sealant. Known application techniques include the use of a spatula, brush, roller, spray, or glue gun. As one example, a bead, strip or "ring" of sealant is applied along the peripheral area 68 of one of the separator layers. Alternatively, individual droplets of sealant can be deposited at sites in the peripheral area 68 with the droplets flowing and covering the peripheral area 68 upon the application of pressure, vacuum and/or heat. As yet another alternative, at least one of the separator layers 18 can be pre-impregnated with sealant. All of these techniques cause the sealant to form a continuous layer. In general, the particular method of deposition is not critical, as long as the sealant is applied to locations where it will eventually form a seal after pressure or vacuum is released. The ultracapacitor becomes sealed by a barrier which is perpendicular to the horizontal capacitor layers which are encased in the barrier.

A compressive force can be applied to promote the flow of the sealant—especially in the case of sealant compositions with very high softening points or glass transition temperatures, such as the EVA based types. Compression can be applied indirectly to the sealant through upper ultracapacitor layers by means of a mechanical press.

The following example is illustrative of the invention.

EXAMPLE

A film portion with a male closure element as shown in FIGS. 4A and 4B was heat welded to one side of a carbon filled polyethylene current collector. The current collector was then screen printed with a carbon-electrolyte slurry to form an electrode. Another current collector with a female element was similarly prepared. A porous polyethylene separator was placed between the two current collectors with carbon electrodes and the package was heat welded on the three sides that did not have the attached closure. Edges of the separator were sealed with HYSOL 7811, a polyamide sealant from Hysol Engineering & Industrial Productons Division of Dexter Corporation, to prevent wicking of electrolyte. An electric potential between 1 and 2 volts was applied to the cell so that moisture trapped within the cell was hydrolyzed, resulting in the formation of gaseous products. The closure was then opened to allow the gases to escape and then immediately reclosed to provide a hermetically sealed cell.

What is claimed:

1. A method of making an ultracapacitor, comprising;

(A) providing a multilayer cell comprising two solid, nonporous current collectors, two porous electrodes separating said current collectors, a porous separator between said electrodes and an electrolyte occupying pores in said electrodes and separator; and (B) sealing said cell with a reclosable hermetic closure, wherein said sealing comprises applying an electric potential to said cell to disassociate water within said cell to hydrogen and oxygen; unmating said reclosable hermetic closure to permit the escape of said hydrogen and oxygen; and mating said reclosable hermetic closure to seal said cell substantially free of water.

2. The method of claim 1, wherein (B) further comprises (i) attaching a first half of said reclosable hermetic closure to a first of said current collectors and coating said first current collector with one of said porous electrodes, (ii) attaching a second half of said reclosable hermetic closure to a second of said current collectors and coating said second current collector with one of said porous electrodes, (iii) placing said separator between said coated first and second current collectors and (iv) mating said halves of said reclosable hermetic closure to seal said cell.

3. The method of claim 1, further comprising heat sealing at least one side of said cell.

4. A method of making a stack of ultracapacitor cells, comprising:

(A) providing in stacked relationship, a plurality of bipolar double layer ultracapacitor cells, at least one comprising porous, oppositely charged electrodes with ionically charged separator disposed between said electrodes;

(B) providing a non-porous current collector between each cell with each current collector heaving adjoining polarized electrodes of different cells bonded thereto;

(C) saturating said electrodes and separators with electrolyte; and (D) sealing at least one of said cells with a reclosable hermetic closure, wherein said sealing comprises applying an electric potential to said cell to disassociate water within said cell to hydrogen and oxygen; unmating said reclosable hermetic closure to permit the escape of said hydrogen and oxygen; and mating said reclosable hermetic closure to seal said cell substantially free of water.

5. The method of claim 4, wherein (D) further comprises (i) attaching a first half of said reclosable hermetic closure to a first of said current collectors and coating said first current collector with one of said porous electrodes, (ii) attaching a second half of said reclosable hermetic closure to a second of said current collectors and coating said second current collector with one of said porous electrodes, (iii) placing said separator between said coated first and second current collectors and (iv) mating said halves of said reclosable hermetic closure to seal said cell.

* * * * *